United States Patent [19]

Lee

[11] Patent Number: 5,384,991
[45] Date of Patent: Jan. 31, 1995

[54] METHOD AND APPARATUS FOR GRINDING AND SLOTTING FRICTION PRODUCTS

[75] Inventor: John T. Lee, N. Charleston, S.C.

[73] Assignee: Leinweber Maschinen GmbH & Co. KG, Wiener Neustadt, Austria

[21] Appl. No.: 32,123

[22] Filed: Mar. 17, 1993

[51] Int. Cl.6 .................................................. B24B 1/00
[52] U.S. Cl. ........................................ 451/57; 451/58
[58] Field of Search .................. 51/3, 5 R, 5 B, 72 L, 51/98 R, 110, 125, 215 AR, 216 R, 216 ND, 217 R, 277, 326, 327, DIG. 3

[56] References Cited

U.S. PATENT DOCUMENTS

| | | | |
|---|---|---|---|
| 2,166,037 | 7/1939 | Campos | 51/277 |
| 2,991,593 | 7/1961 | Cohen | 51/5 B |
| 3,888,050 | 6/1975 | Elm | 51/328 |
| 4,520,595 | 6/1985 | Diener | 51/3 |
| 4,704,824 | 11/1987 | Horner | 51/277 |
| 4,829,716 | 5/1989 | Ueda | 51/3 |

*Primary Examiner*—Jack W. Lavinder
*Attorney, Agent, or Firm*—Herbert L. Lerner; Laurence A. Greenberg; Werner H. Stemer

[57] ABSTRACT

An apparatus for grinding molded friction products comprises a rotary indexing table with a substantially horizontal indexing table. The table surface indexes from one indexing position to another. Tool fixtures support friction product parts to be ground on a friction surface thereof. The tool fixtures are disposed on the rotary indexing table at the indexing positions. A grind stone is disposed above the indexing table surface for grinding the friction product part supported in the tool fixture at one of the indexing positions. The grind stone rotates about a grind axis which is substantially parallel to said central axis of said indexing grind table, but can be tilted by a small angle so as to provide a skim cut grind to the product. The method provides for performing operations at all indexing positions simultaneously.

11 Claims, 6 Drawing Sheets

METHOD AND APPARATUS FOR GRINDING AND SLOTTING FRICTION PRODUCTS

BACKGROUND OF THE INVENTION

FIELD OF THE INVENTION

The invention relates to a method and an apparatus for grinding and slotting friction products, and in particular integrally molded friction products, such as disk pads.

The invention relates particularly to a manufacturing environment known as J.I.T. (Just-In-Time), a manufacturing process which provides products efficiently at the time parts are needed in processing. Apparatus utilized in the J.I.T. environment are required to offer very quick changeover between different products and easy adaptability to various dimensional settings. They should be reliable and, advantageously, they should provide automatic loading and unloading features.

Reference will be had in the following to integral molding processes in the context of friction products. Integrally molded disc pads, for instance, are brake pads for motor vehicles which are produced in heated molds where the steel backing plate is directly adhered to the friction material. The adhesion and the molding of the material are effected by heat and pressure, normally assisted with an adhesive. The integral molding process is replacing the older process of forming the friction material and then drilling and attaching the molded friction pad to the steel back plate with rivets.

After the afore-described molding operation, the friction product is subjected to a finishing process, where it is fine-machined to a finished thickness typically within +/− 0.005" machining tolerance. Integrally molded disc pads now entering the finishing process require a new generation of machines. The older machines, for instance, could not handle the variety of steel back plates which often have pins and protrusions from the surface to facilitate mounting in the vehicle. In addition, a significant quantity of IM disc pads needed slotting across the friction surface to improve performance which required an additional feature either on the machine or a separate process.

DESCRIPTION OF THE RELATED ART

There are currently two types of pertinent apparatus found in the industry. They may be broadly categorized as linear and rotary.

The linear machines typically use chain drives or pusher cylinders to move parts under grind stones and slot wheels while held captive in a tool. The linear grinders have typically led to difficulties in controlling the thickness of the grind due to wear strips, chain drives, tools, and drive components which are not rigidly mounted on a sturdy and stable surface.

Rotary tables may be constructed so as to provide the required accurate and sturdy surface. However, no rotary machine is known which allows slotting on an apparatus configured for the grinding process. This is due to the difficulty associated with providing the friction product with a linear slot while the same is moving on a rotating table.

All of the prior art devices require many types of tools to handle each part or group of parts and a significant amount of time (15 minutes and more) is required to change from one part number to another for processing. Once the changeover is made the machines then must be adjusted for grinding to proper thickness which adds more time and causes defect parts if the trial grind parts are made too thin in the adjustment process. Tooling typically used in the prior art is machined to fit the specific part or group of parts. New tools have to be shaped to handle the new steel shapes as required. Many operations have dozens of different tool types to process the many part numbers.

SUMMARY OF THE INVENTION

It is accordingly an object of the invention to provide an apparatus and a method for grinding and slotting friction products, and in particular integrally molded friction products, which overcomes the hereinafore-mentioned disadvantages of the heretofore-known devices of this general type and which allows accurate grinding of the surface on the sturdy rotary table surface and which allows to perform a slotting process while the product is still placed on the grinding support surface.

It is a further object of the invention to provide very quick change-over between different product batches and increased versatility in the context of differently shaped product part numbers.

With the foregoing and other objects in view there is provided, in accordance with the invention, an apparatus for grinding molded friction products, comprising:

a rotary indexing table having a substantially horizontal indexing table surface rotatable about a central axis; index drive and index control means operatively connected to the rotary indexing table for rotating the rotary indexing table about the central axis and intermittently stopping the rotary indexing table at given indexing positions; tool fixture means for supporting friction product parts to be ground on a friction surface thereof, the tool fixture means being disposed on the rotary indexing table at the given indexing positions;

grind stone means disposed above the indexing table surface for grinding the friction product part supported in the tool fixture means; the grind stone means rotating about a grind axis substantially parallel to the central axis of the indexing grind table; and grind motor means for driving the grind stone means.

In accordance with an added feature of the invention, the apparatus includes a slotting assembly for forming a linear slot in the friction product part when the part is stopped at one of the given indexing positions, the slotting assembly being disposed at the one indexing position, and means for driving the slotting assembly linearly across the friction product part in a radial direction with regard to the central axis of the rotary indexing table and means for adjusting a depth of the linear slot formed in the friction product part.

In accordance with an additional feature of the invention, the indexing table surface has openings formed therein at the given indexing positions, the tool fixture means including pins extending into the openings when the tool fixture means are placed on the indexing table surface and clamp means for clamping the tool fixture to the rotary indexing table.

In accordance with a further feature of the invention, the grind stone means have a grind surface, the tool fixture means having a friction product part support surface and adjustment screws for adjusting a spacing between the grind surface and the friction product part support surface, the spacing defining a ground product thickness.

In accordance with yet another feature of the invention, the grind stone means are a circular grind wheel having a diameter, and including tilt means for tilting the grind axis relative to the central axis of the indexing table by an angle substantially equal to $\alpha = \arcsin [(d/4)*(A-B)]^{-1}$, where d is the diameter of the grind wheel and A and B are spacings of mutually opposite edges of the grind wheel from the indexing table surface.

In accordance with yet an added feature of the invention, the apparatus includes means for adjusting a height of the grind stone means relative to the indexing table surface. Such adjustment is preferably made by means of a hand wheel and the height may be indicated on a dial.

In accordance with yet an additional feature of the invention, the given indexing positions are four indexing positions being offset relative to one another by 90°. It is understood that each of the indexing positions may have two tool fixtures each, for processing double runs of product. Alternatively, several more indexing positions are possible, depending on the number of processing steps to be performed on the indexing table.

With the objects of the invention in view, there is further provided, in accordance with the invention, a method for grinding and slotting molded friction products, which comprises the steps of a) loading a friction product to be ground to a finished thickness and to be provided with a linear slot across a friction surface thereof on a rotary indexing table at a first indexing position; b) indexing the rotary indexing table by one indexing position such that the friction product is transported from the first indexing position to a second indexing position; c) grinding a friction surface and providing the friction product with a finished thickness at the second indexing position; d) indexing the rotary indexing table by one indexing position such that the friction product is transported from the second indexing position to a third indexing position; e) cutting a substantially linear slot across the friction surface of the friction product at the third indexing position; f) indexing the rotary indexing table by one indexing position such that the friction product is transported from the third indexing position to a fourth indexing position; g) unloading the friction product from the rotary indexing table at the fourth indexing position.

In accordance with a concomitant feature of the invention, the foregoing steps a), c), e) and g) are performed simultaneously.

The apparatus and method according to the invention provide a number of advantages and improvements over the prior art as discussed in the following.

The rotary table with index drive system according to the invention provides accurate grinding of the surface on the sturdy rotary table. Additionally, a linear slot may be provided to the friction product while the same is still disposed in the grinder support. In other words, the slotting process is performed integrally with the grinding process surface. No additional changeover and the associated adjustments are thus necessary.

A special advantage is attained with the diamond grind stone employed in the novel apparatus which enables the part to stop after the cycle under the stone. The apparatus and method according to the invention provide the following critical key features:

Due to the novel configuration, the table is provided with a small diameter to keep the grind surface sturdy and stable for proper support during grinding.

The friction product travels at a relatively slow speed as it passes under the diamond grind surface. Grind quality and accuracy is thus enhanced. As the support table indexes, the product stops under the grind stone and it is not required to travel the full distance to completely pass under the stone.

Due to the indexing feature, a diamond grind wheel may be provided with a diameter which is large enough so as to run in excess of the minimum speed recommended by diamond grind stone suppliers. This feature extends the operational life of the costly stone and yet further improves grind quality.

The indexing feature of the rotary table surface allows precision stopping and accurate linear slotting.

Finally, the novel construction allows for automatic loading and unloading. Due to the indexing feature, the rotary system stops for a sufficient amount of time to allow loading and unloading devices to load the deposit position and to engage and remove the finished product, respectively.

Other features which are considered as characteristic for the invention are set forth in the appended claims.

Although the invention is illustrated and described herein as embodied in a method and an apparatus for grinding and slotting friction products, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 6b is a diagrammatic view of the slotter of FIG. 6a;

DESCRIPTION OF THE PREFERRED EMBODIMENTS

Figure 1:
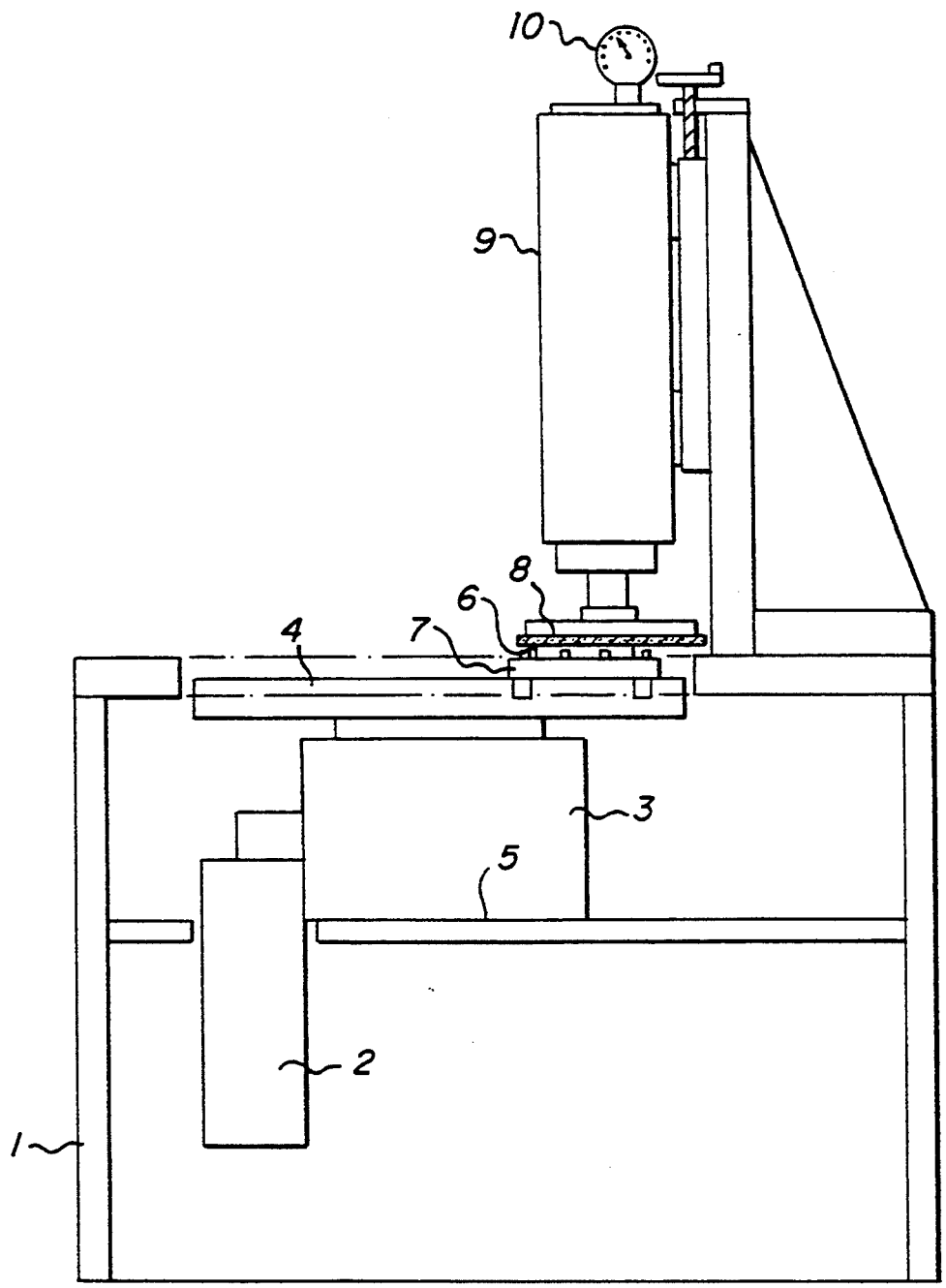
FIG. 1 is a diagrammatic, elevational view of the apparatus according to the invention.

Referring now to the Figures of the drawing in detail and first, particularly, to FIG. 1 thereof, there is seen a cross-sectional view of an apparatus according to the invention. A base frame 1 supports an indexing motor 2 which, through transmission by a indexing drive gear box 3 drives an indexing grind table 4. The gear box 3 is supported on a precision machined flat/parallel surface 5 provided on a shelf in the base frame 1.

The rotary indexing table used in the preferred embodiment is basically available from Ferguson Company. The commercially available Ferguson table was specifically adapted to the instant invention. The drive has special cams with a 60% constant velocity. This results in 90% of full speed within one inch of arc travel and stopping within one inch at the end of a 90° rotation, which, as will be explained in the following, corresponds to one index. Usually, Ferguson drive units provide a speed pattern which follows a sinusoidal curve, i.e. the indexing is started slowly, increased to full speed, and then stopped slowly and smoothly. For this invention, the drive was adapted to smoothly but quickly attain full speed and to stop in the same manner.

The time period at which the index rests between cycles can also be adjusted. For instance, more time may be needed for slotting and loading/unloading. Furthermore, the motor speed is adjustable, so as to decrease the travel time of the indexing table between index stations.

As a part 6, which is supported in a tool 7 or tool fixture 7 on the grind table surface 4, rotates with the grind table 4, it passes under a grind wheel or grind stone 8. The grind stone 8, usually a 12" diamond grind stone, is driven by a grind motor 9, which is mounted on the common base frame 1 in a conventional manner. The height of the motor 9, and thus the height of the grind wheel 8, is manually fine-adjustable and the height is indicated on a height dial 10.

Figure 2:
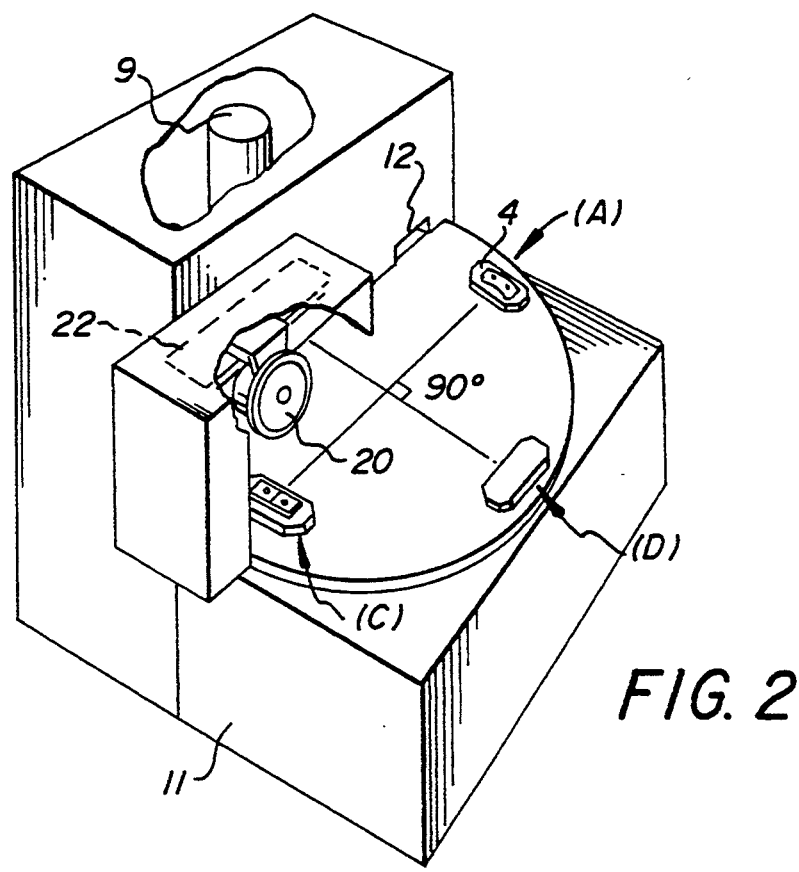
FIG. 2 is a perspective view of the apparatus.
Figure 4:
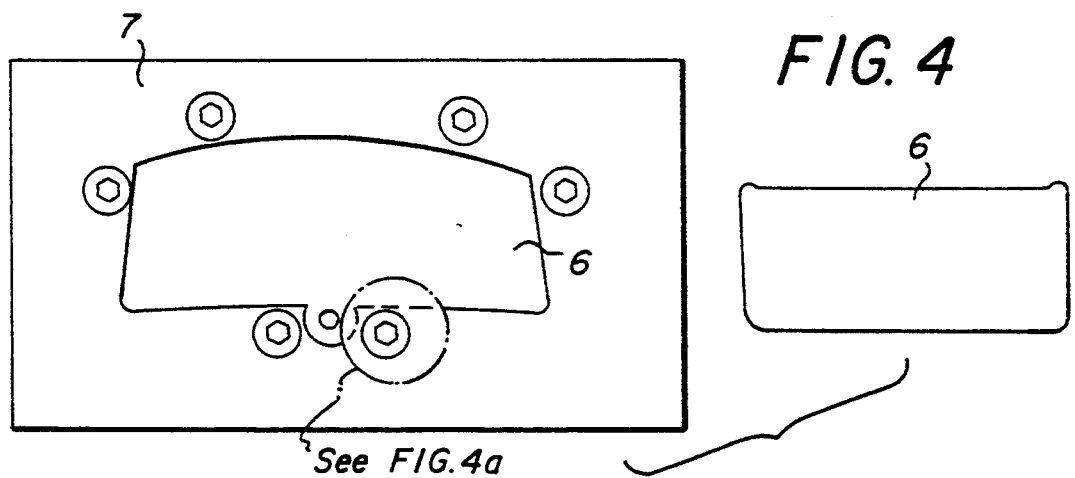
FIG. 4 is a top-plan view of a tool cavity and a vertical sectional view of detail thereof.
Figure 4A:
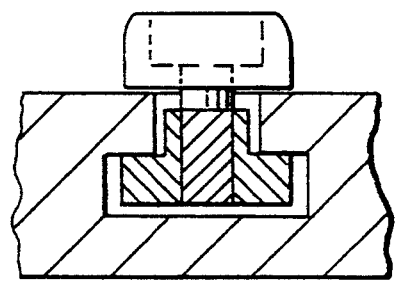

Referring now to FIG. 2, the frame 1 is enclosed by a housing 11. The grind table 4 has four index positions A–D, offset from one another by 90°. In a first step, a part 6 is loaded into the tool 7 at the position A as the table is stopped. At the same time, another part is slotted at position C, while another part is removed at position D as all grind and slot operations on that part are completed.

In a second step, the index table 4 rotates counterclockwise by one index. For instance, the part 6 which was just loaded at position A, is moved to position B. On that path, the part 6 passes by a safety sensor 12. If the safety sensor 12 determines that the part 6 moving toward the grind wheel 8 is not firmly seated in the tool 7, or cocked sideways, for instance, the index drive motor 2 will immediately stop index table rotation.

As the part 6 reaches position B, it receives its grind as it passes under the leading edge of the diamond stone surface. From position B, the part 6 moves to position C.

Figure 3A:
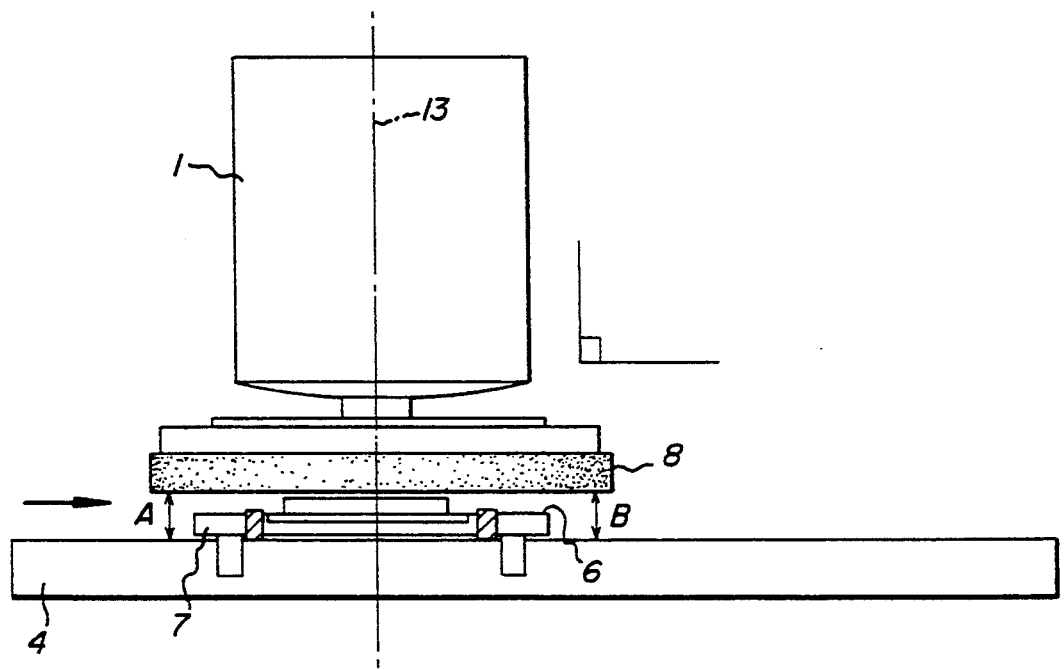
FIGS. 3a and 3b are detail views of the grind stone and tool fixture assembly.
Figure 3B:
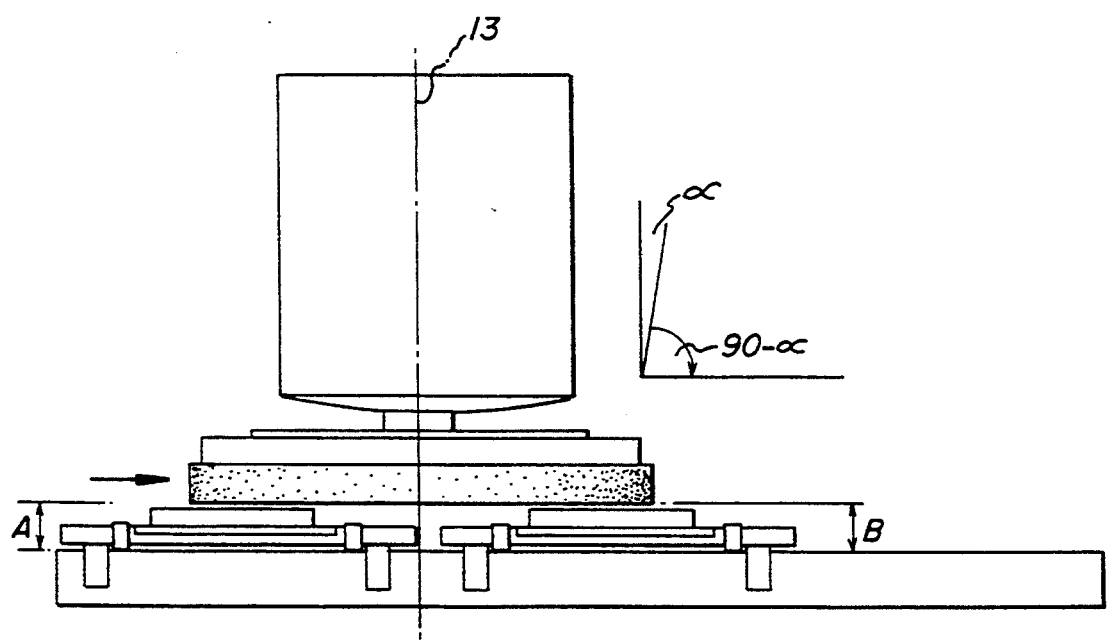
Figure 5A:
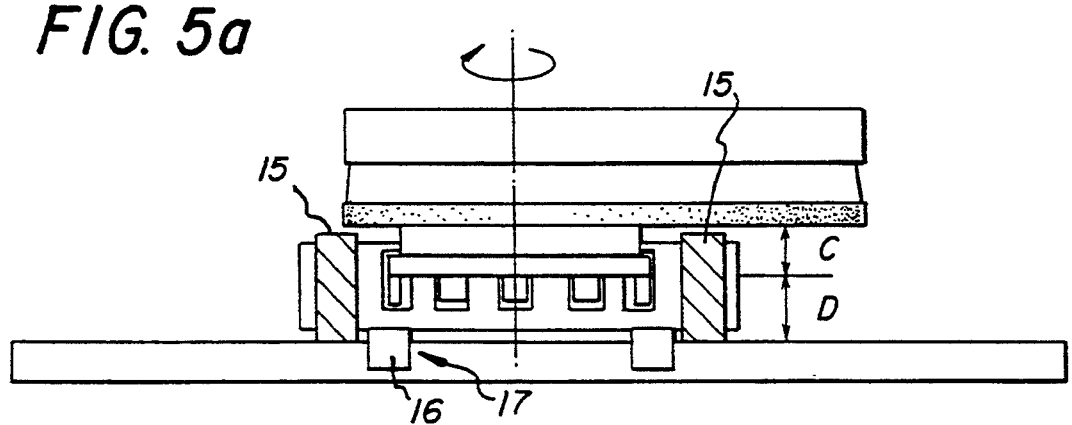
FIGS. 5a-5c are various views of the pallet height adjustment assembly.
Figure 5B:
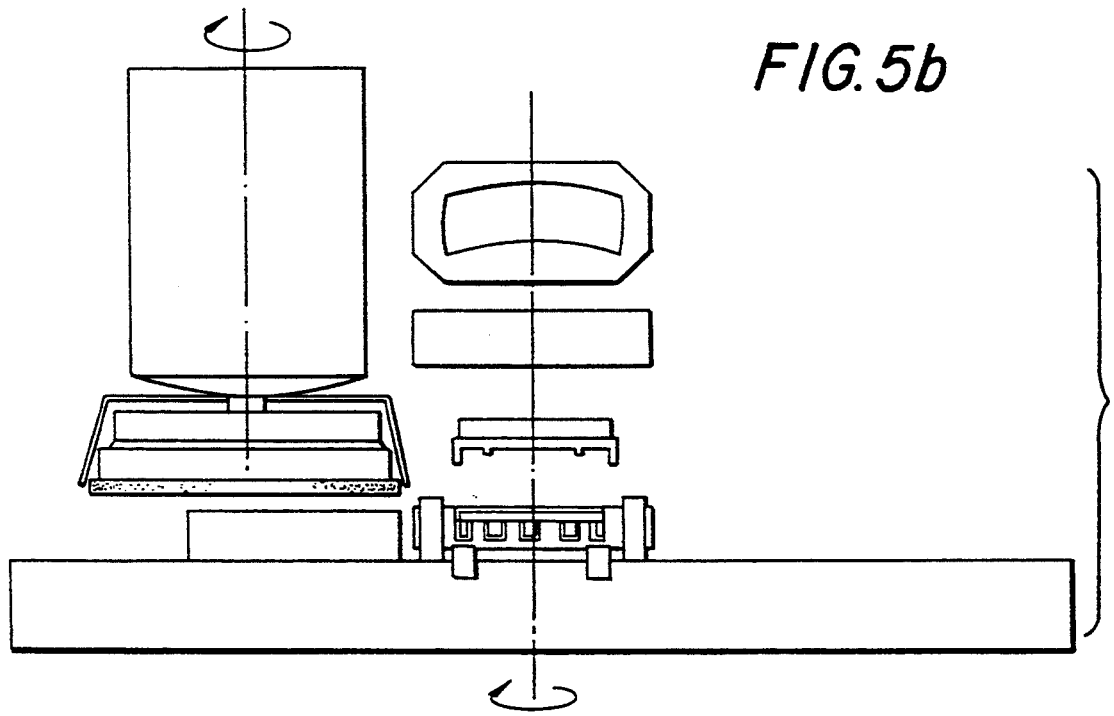
Figure 5C:
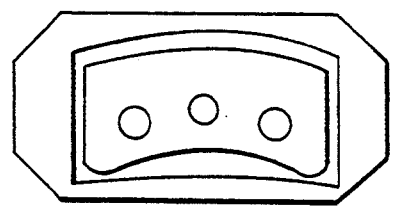

It may be advantageous to provide the part with a skim cut grind as it exits under the trailing edge of the stone 8. With reference to FIGS. 3a and 3b, the grind motor 9 has a vertical axis 13 which coincides with the angular velocity vector of the grind stone rotation. As shown in FIG. 3a, the grind table, and thus the tool 7 and the part 6, are exactly perpendicular to the motor axis, i.e. parallel to the grind surface. The distances A and B in FIG. 3a are equal. When a skim cut grind is desired, the stone mounting is tilted by a small angle $\alpha$. As shown in FIG. 3b, this causes the distance A to become slightly greater than the distance B. The difference between A and B is about $10^{-3}$ inch (one thousandth). In a 12" grind wheel, the tilt angle is determined from $\alpha = \arcsin \{([(d/4)*(A-B)]^{-1}\}$, where d is the diameter of the wheel.

It is noted, in this context, that the terminology "substantially parallel", as recited in the claims, includes a deviation from parallel which incorporates the angle $\alpha$. In other words, "substantially parallel" is to be interpreted as meaning "parallel $\pm \alpha$".

In all following steps, the foregoing steps are identically repeated until the full product run has been completed.

One of the primary advantages of the grinder according to the invention is found in its versatility in the J.I.T. environment. The grinder is provided with universal grinder tooling with vertical preset adjustments. Instead of providing a slew of tool types for the many operations and the many different part numbers (about 600 in the U.S. and many more in Europe and Japan), the invention provides for universal tooling. Any type of part may be processed with the preset height adjustments with only a few tools. Due to the indexing movement as described above, a grind/slot machine according to the invention uses four tools on the table and have four tools on the machine being setup and/or adjusted for the next part number to process.

With reference to FIGS. 4 and 5a–5c, tooling is used in the process as follows: (1) Grind/slot machine is running with four tools in use as described above. (2) The next part number is selected and the universal/preset height tools are adjusted online (external setup). The part 6 is placed on the tool 7 and quick adjustment stops 14 or locator pins 14 are slid against the part edges where required and tightened with allan tightening screws. The stops 14 move in the x and y directions in several T slots machined in the tool base.

In the preferred embodiment, the tool cavity is generally rectangular 9"×4", with oblique corners. The T-slots make easy shifting of the locator pins possible and very quick clamping by way of an allan wrench. Any shape of part may be accommodated, as long as it is within the maximum size allowed by the tool cavity.

When the part 6 is positioned in the tool 7, three cavity depth or tool height adjustment screws 15 are turned so as to adjust a base height C between the cavity bottom of the tool 7, upon which the steel backing plate and friction pad sit, and the grind stone 8. This allows the part to be ground to the proper finished thickness without performing numerous small adjustments to the grind stone motor assembly after the tooling is installed.

The exact height needed for grinding is determined by the following formula: The stone height C+D is known, as it has been adjusted to a given height. The height C of the part (steel plate and friction material) is subtracted from the height C+D, resulting in the height D to which the tool is to be set. The height adjustment screws are provided with simple cross-hair type index marks. Very accurate adjustment is thus possible.

An extremely important advantage of the apparatus is noted in this context. As the height of the tool, i.e. the grind thickness, can be set very easily, it is possible to set each of the four tools at positions A–D to different heights. As the outline shape of the part is easily adjusted as well, full versatility is achieved to grind in mixed production.

Each tool is provided with precision dowel pins 16 which fit into precision locator holes 17 in the rotating table 4. The locator holes 17 are provided with non-illustrated hardened bushings. The tool 7 is locked in place on the table at the respective position A through D with a quick turn clamp 18.

As the part number change takes place, the complete tool is removed from position D and a new tool, preferably with a part already in place, is placed into position either when the table is still at position D or has moved to position A.

It can be seen that changeover time becomes virtually zero for each part. As the table indexes further, the changeover process is repeated a total of four times until all tools for the new part number run are in place.

In the first few runs, finished parts (parts unloaded at position D) are checked for proper grind thickness and slot condition. If necessary a 'microfine' adjustment of the diamond stone motor 9 can be made to "fine-tune" the grind into the center of the tolerance. The hand wheel 19 may be used for that purpose. It has been found, however, that, when the setup is done properly such fine adjustments are not necessary.

Figure 6A:
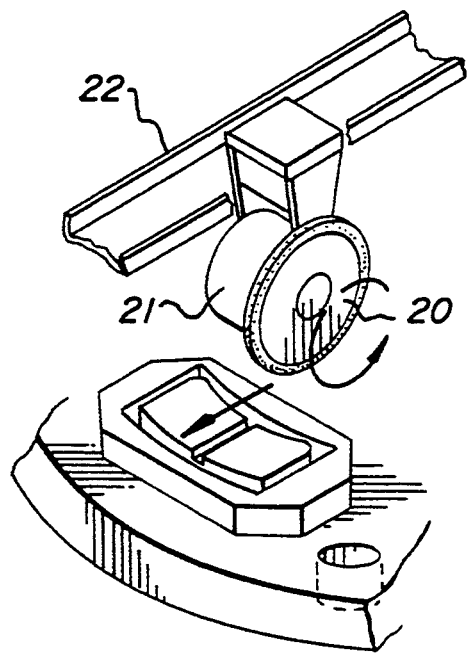
FIG. 6a is a perspective view of the slotter assembly.
Figure 6B:
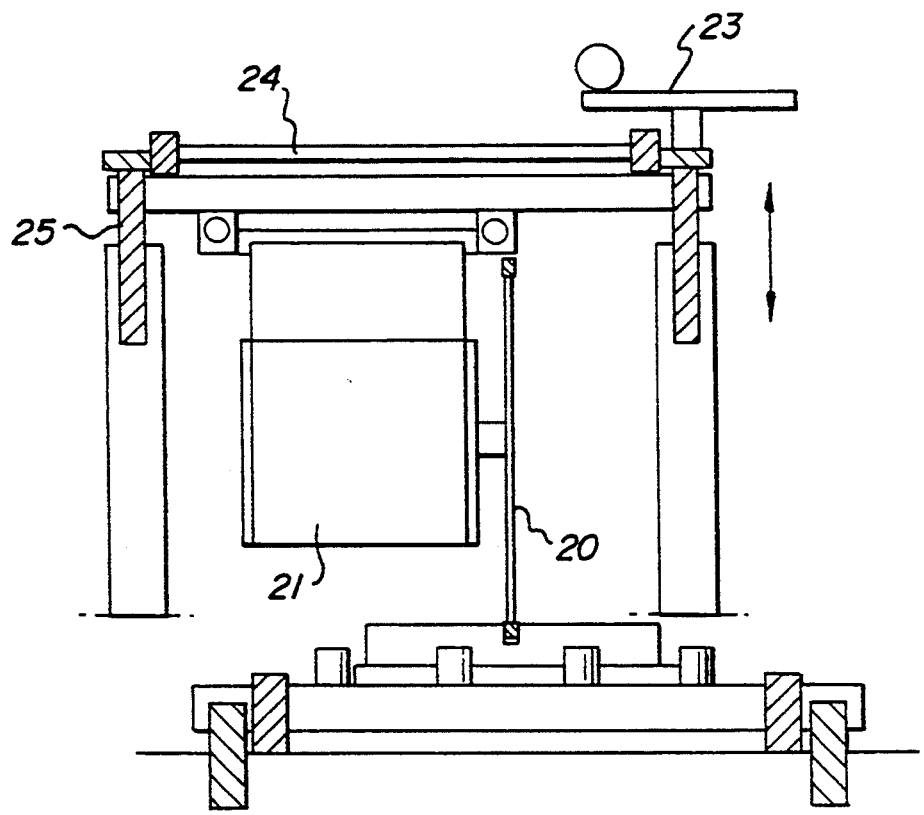

Slotting is performed at position C. With reference to FIGS. 6a and 6b, when the table 4 has stopped at the index C, a slotting wheel 20 is moved radially inward towards the center of the table 4. The slotting wheel 20 is driven by a slotting motor 21, which is suspended from a slide rail 22. Any movement of the motor 21 across the slide rail 22 may be actuated either manually or automatically.

The height of the slotting wheel 21, and thus the depth of the blind slot in the part 4, is adjusted by means of a handwheel 23. In order to provide a vertical position of the slotting wheel, a gear rod 24 coordinates the rotation of threaded rods 25, which cause the slotting motor 21 to be raised or lowered, depending on the sense of rotation of the handwheel 23. The depth of the adjustment, i.e. the depth of the slot in the product, is locked by non-illustrated set screws.

As the indexing table stops with the part 4 in position C, the slotter assembly is commanded to move towards or away from the center of the indexing table. The slot cut may be made in normal or climb grind directions; in other words, the motor cuts in both radial directions and stops on either side of the part to await the next cut. It is understood that during the slotting operation, all other operations on positions A, B and D continue.

Figure 7A:
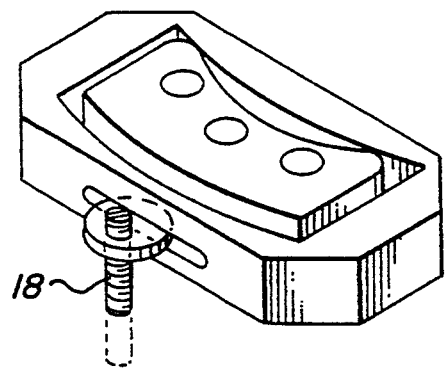
FIG. 7a is a perspective view of the quick clamp for the tool fixture.
Figure 7B:
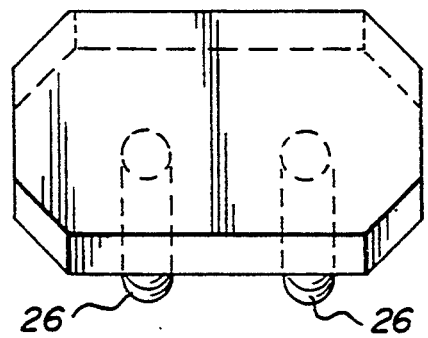
FIG. 7b is a perspective view of the tool fixture with table pins.
Figure 7C:
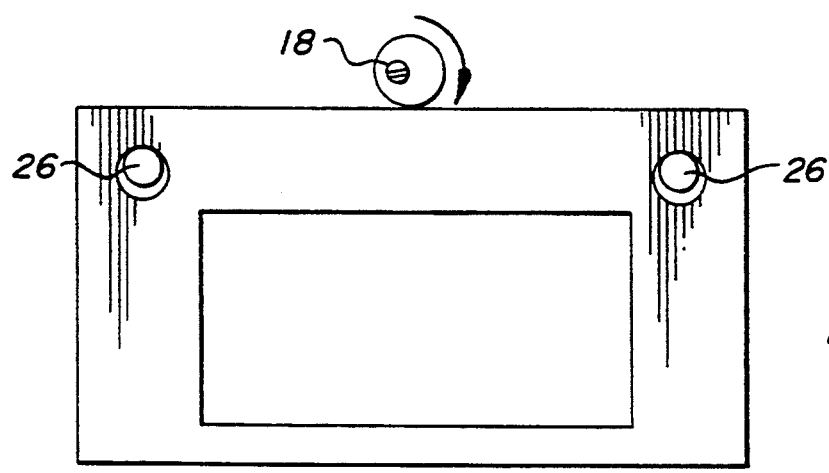
FIG. 7c is a diagrammatic view of the loose fit pin tool clamp assembly.

Referring now to FIGS. 7a–7c, the tool fixture 7 is rather easily clamped into the table surface. Loose fit pins 26 or locator pins 26 are inserted into corresponding holes in the grind table surface. As the quick clamp 18 is rotated clockwise, its off-center socket head exerts a force on the tool 7. As show in FIG. 7c, the force vector resulting from that rotation is downward, which causes the locator pins 26 to seek the center of the bushing hole in the indexing table.

I claim:

1. An apparatus for grinding molded friction products, comprising:
    a rotary indexing table having a substantially horizontal indexing table surface rotatable about a central axis; index drive and index control means operatively connected to said rotary indexing table for rotating said rotary indexing table about said central axis and intermittently stopping said rotary indexing table at given indexing positions;
    tool fixture means for supporting friction product parts to be ground on a friction surface thereof, said tool fixture means being disposed on said rotary indexing table at said given indexing positions;
    grind stone means disposed above said indexing table surface for grinding the friction product part supported in said tool fixture means; said grind stone means rotating about a grind axis substantially parallel to said central axis of said indexing grind table; and grind motor means for driving said grind stone means;
    wherein said grind stone means are a circular grind wheel having a diameter, and including tilt means for tilting said grind axis relative to said central axis of said indexing table by an angle substantially equal to $a = \arcsin\{[(d/4)*(A-B)]^{-1}\}$, where d is the diameter of said grind wheel and A and B are spacings of mutually opposite edges of said grind wheel from said indexing table surface.

2. The apparatus according to claim 1, including a slotting assembly for forming a linear slot in the friction product part when the part is stopped at one of said given indexing positions, said slotting assembly being disposed at said one indexing position, and means for driving said slotting assembly linearly across the friction product part in a radial direction with regard to said central axis of said rotary indexing table and means for adjusting a depth of the linear slot formed in the friction product part.

3. The apparatus according to claim 1, wherein said indexing table surface has openings formed therein at said given indexing positions, said tool fixture means including pins extending into said openings when said tool fixture means are placed on said indexing table surface and clamp means for clamping said tool fixture to said rotary indexing table.

4. The apparatus according to claim 3, wherein said grind stone means have a grind surface, said tool fixture means having a friction product part support surface and adjustment screws for adjusting a spacing between said grind surface and said friction product part support surface, said spacing defining a ground product thickness.

5. The apparatus according to claim 1, including means for adjusting a height of said grind stone means relative to said indexing table surface.

6. The apparatus according to claim 1, wherein said indexing table surface is substantially horizontal and said central axis is substantially vertical.

7. The apparatus according to claim 1, wherein said given indexing positions are four indexing positions being offset relative to one another by 90°.

8. A method for grinding and slotting molded friction products, which comprises:
   a) loading a friction product to be ground to a finished thickness and to be provided with a linear slot across a friction surface thereof on a rotary indexing table at a first indexing position;
   b) indexing the rotary indexing table by one indexing position such that the friction product is transported from the first indexing position to a second indexing position;
   c) grinding a planar friction surface and providing the friction product with a finished thickness at the second indexing position;
   d) indexing the rotary indexing table by one indexing position such that the friction product is transported from the second indexing position to a third indexing position;
   e) cutting a substantially linear slot across the planar friction surface of the friction product in a radial direction with regard to a rotary axis of the rotary indexing table at the third indexing position;
   f) indexing the rotary indexing table by one indexing position such that the friction product is transported from the third indexing position to a fourth indexing position; and
   g) unloading the friction product from the rotary indexing table at the fourth indexing position.

9. The method according to claim 8, which comprises performing steps a), c), e) and g) simultaneously.

10. An apparatus for grinding molded friction products, comprising:

a rotary indexing table having a substantially horizontal indexing table surface rotatable about a central axis; index drive and index control means operatively connected to said rotary indexing table for rotating said rotary indexing table about said central axis and intermittently stopping said rotary indexing table at given indexing positions;

tool fixture means for supporting friction product parts to be ground on a friction surface thereof, said tool fixture means being disposed on said rotary indexing table at said given indexing positions;

grind stone means disposed above said indexing table surface at a first index position for grinding a planar surface of the friction product part supported in said tool fixture means; said grind stone means rotating about a grind axis substantially parallel to said central axis of said indexing grind table; grind motor means for driving said grind stone means;

and a slotting assembly for forming a linear slot in the planar surface of the friction product part by driving said slotting assembly linearly across the friction product part in a substantially radial direction with regard to said central axis of said rotary indexing table.

11. The apparatus according to claim 10, including means for adjusting a depth of the linear slot formed in the planar surface of the friction product part.

* * * * *